(12) United States Patent
Novotney et al.

(10) Patent No.: US 8,078,776 B2
(45) Date of Patent: *Dec. 13, 2011

(54) ELECTRONIC DEVICE HAVING A DUAL KEY CONNECTOR

(75) Inventors: Donald J. Novotney, San Jose, CA (US); John B. Filson, Mountain View, CA (US); David Tupman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/967,859

(22) Filed: Dec. 14, 2010

(65) Prior Publication Data

US 2011/0086551 A1  Apr. 14, 2011

Related U.S. Application Data

(63) Continuation of application No. 12/210,022, filed on Sep. 12, 2008, now Pat. No. 7,853,746, which is a continuation of application No. 10/833,689, filed on Apr. 27, 2004, now Pat. No. 7,441,062.

(51) Int. Cl.
*G06F 13/00* (2006.01)
(52) U.S. Cl. ............. 710/62; 710/72; 710/300; 381/384
(58) Field of Classification Search .............. 710/62–66, 710/72, 8–19, 300–315, 104–107, 324–340; 381/123, 361, 384; 439/218, 222, 607, 610, 439/638, 660, 939
See application file for complete search history.

(56) References Cited

U.S. PATENT DOCUMENTS

| 4,850,899 | A | 7/1989 | Maynard |
| 4,874,316 | A | 10/1989 | Kamon et al. |
| 4,972,470 | A | 11/1990 | Farago |
| 5,055,069 | A | 10/1991 | Townsend et al. |

(Continued)

FOREIGN PATENT DOCUMENTS

DE  101 31 299 A1  1/2003

(Continued)

OTHER PUBLICATIONS

"iPodDock/iPod Cradle"; www.bookendz/dock_cradle.htm, downloaded Feb. 27, 2003, 2 pages.

(Continued)

*Primary Examiner* — Raymond Phan
(74) *Attorney, Agent, or Firm* — Kilpatrick Townsend & Stockton LLP

(57) ABSTRACT

A connector interface system for a communication device is disclosed. The interface includes a docking connector. The docking connector includes first make/last break contacts that minimize internal damage to the internal electronics. The docking connector also includes specific keying arrangement to prevent noncompliant connectors from being plugged in, and thereby minimizes potential damage to the multi-communication device. The connector interface system also includes a remote connector which provides for the ability to output audio, input audio, provides I/O serial protocol, and to provide an output video. Embodiments of the present invention allow for a standard headphone cable to be plugged in but also for special remote control cables, microphone cables, video cables could be utilized in such a system. The connector interface system also includes a serial protocol to control device features. These controls help a user sort and search for data more efficiently within the device.

38 Claims, 5 Drawing Sheets

U.S. PATENT DOCUMENTS

| | | | |
|---|---|---|---|
| 5,077,552 A | 12/1991 | Abbate | |
| 5,080,603 A | 1/1992 | Mouissie | |
| 5,104,243 A | 4/1992 | Harding | |
| 5,108,313 A | 4/1992 | Adams | |
| D333,460 S | 2/1993 | Huang | |
| 5,186,646 A | 2/1993 | Pederson | |
| 5,277,624 A | 1/1994 | Champion | |
| 5,357,608 A | 10/1994 | Bartow et al. | |
| 5,379,057 A | 1/1995 | Clough et al. | |
| 5,438,678 A | 8/1995 | Smith | |
| 5,457,784 A | 10/1995 | Wells et al. | |
| 5,568,525 A | 10/1996 | de Nijs et al. | |
| 5,574,947 A | 11/1996 | Massa | |
| 5,586,893 A | 12/1996 | Mosquera | |
| 5,618,045 A | 4/1997 | Kagan et al. | |
| 5,660,558 A | 8/1997 | Osanai et al. | |
| 5,675,362 A | 10/1997 | Clough et al. | |
| 5,737,364 A | 4/1998 | Cohen et al. | |
| 5,830,001 A | 11/1998 | Kinoshita | |
| 5,832,244 A | 11/1998 | Jolley | |
| 5,901,049 A | 5/1999 | Schmidt et al. | |
| 5,941,963 A | 8/1999 | Charles | |
| 5,975,957 A | 11/1999 | Noda et al. | |
| 5,983,073 A | 11/1999 | Ditzik | |
| 6,030,229 A | 2/2000 | Tsutsui | |
| 6,053,773 A | 4/2000 | Wu | |
| 6,073,201 A | 6/2000 | Jolley et al. | |
| 6,139,373 A | 10/2000 | Ward et al. | |
| 6,154,798 A | 11/2000 | Lin et al. | |
| 6,183,302 B1 | 2/2001 | Daikuhara et al. | |
| 6,203,345 B1 | 3/2001 | Roque et al. | |
| 6,206,480 B1 | 3/2001 | Thompson | |
| 6,267,623 B1 | 7/2001 | Hisamatsu | |
| 6,304,764 B1 | 10/2001 | Pan | |
| 6,314,479 B1 | 11/2001 | Frederick et al. | |
| 6,319,061 B1 | 11/2001 | Chen et al. | |
| 6,322,396 B1 | 11/2001 | Kuan | |
| 6,344,727 B1 | 2/2002 | Desai et al. | |
| 6,353,169 B1 | 3/2002 | Juszkiewicz et al. | |
| 6,354,713 B1 | 3/2002 | Leifer et al. | |
| 6,431,915 B1 | 8/2002 | Ko | |
| 6,454,592 B2 | 9/2002 | Takagi | |
| 6,461,173 B1 | 10/2002 | Mizuno et al. | |
| 6,464,542 B1 | 10/2002 | Lee | |
| 6,468,110 B2 | 10/2002 | Fujino et al. | |
| 6,478,603 B1 | 11/2002 | Wu | |
| 6,480,378 B2 | 11/2002 | Chang | |
| 6,485,328 B1 | 11/2002 | Wu | |
| 6,523,124 B1 | 2/2003 | Lunsford et al. | |
| 6,524,119 B2 | 2/2003 | Kato et al. | |
| 6,549,401 B2 | 4/2003 | Lin et al. | |
| 6,552,567 B1 | 4/2003 | Marsh et al. | |
| 6,561,815 B1 | 5/2003 | Schmidt | |
| 6,570,756 B2 | 5/2003 | Alfonso et al. | |
| 6,577,877 B1 | 6/2003 | Charlier et al. | |
| 6,589,076 B1 | 7/2003 | Davis et al. | |
| 6,591,085 B1 | 7/2003 | Grady | |
| 6,608,264 B1 | 8/2003 | Fouladpour | |
| 6,616,473 B2 | 9/2003 | Kamata et al. | |
| 6,631,098 B2 | 10/2003 | Chang et al. | |
| 6,633,932 B1 | 10/2003 | Bork et al. | |
| 6,653,813 B2 | 11/2003 | Khatri | |
| 6,658,516 B2 | 12/2003 | Yao | |
| 6,663,420 B1 | 12/2003 | Xiao | |
| 6,674,995 B1 | 1/2004 | Meyers et al. | |
| 6,728,546 B1 | 4/2004 | Peterson et al. | |
| 6,733,310 B2 | 5/2004 | Fujikura et al. | |
| 6,754,468 B1 | 6/2004 | Sieben et al. | |
| 6,766,175 B2 | 7/2004 | Uchiyama | |
| 6,776,626 B2 | 8/2004 | Huang et al. | |
| 6,776,665 B2 | 8/2004 | Huang | |
| 6,782,239 B2 | 8/2004 | Johnson et al. | |
| 6,798,647 B2 | 9/2004 | Dickie | |
| 6,799,226 B1 | 9/2004 | Robbin et al. | |
| 6,813,528 B1 | 11/2004 | Yang | |
| 6,816,376 B2 | 11/2004 | Bright et al. | |
| 6,856,506 B2 | 2/2005 | Doherty et al. | |
| 6,859,854 B2 | 2/2005 | Kwong | |
| 6,959,205 B2 | 10/2005 | Yambe | |
| 6,973,516 B1 | 12/2005 | Athanas et al. | |
| 6,973,658 B2 | 12/2005 | Nguyen | |
| 6,988,897 B2 | 1/2006 | Belongia et al. | |
| 6,991,483 B1 | 1/2006 | Milan et al. | |
| 7,004,787 B2 | 2/2006 | Milan | |
| 7,054,963 B2 | 5/2006 | Betts-LaCroix et al. | |
| 7,054,965 B2 | 5/2006 | Bell et al. | |
| 7,056,153 B2 | 6/2006 | Watanabe et al. | |
| 7,107,296 B2 | 9/2006 | Novak et al. | |
| 7,110,755 B2 | 9/2006 | Shibasaki et al. | |
| 7,114,988 B2 | 10/2006 | Sato et al. | |
| 7,149,475 B2 | 12/2006 | Kawamura | |
| 7,187,948 B2 | 3/2007 | Alden et al. | |
| 7,284,036 B2 | 10/2007 | Ramaswamy | |
| 7,293,122 B1 * | 11/2007 | Schubert et al. | 710/62 |
| 7,298,765 B2 | 11/2007 | Ganton et al. | |
| 7,390,197 B2 | 6/2008 | Merz | |
| 7,441,062 B2 | 10/2008 | Novotney et al. | |
| 7,632,114 B2 | 12/2009 | Danner et al. | |
| RE41,224 E | 4/2010 | Kubota et al. | |
| 7,751,853 B2 | 7/2010 | Fadell et al. | |
| 7,783,070 B2 * | 8/2010 | Fadell et al. | 381/384 |
| 2002/0002035 A1 | 1/2002 | Sim et al. | |
| 2002/0006748 A1 | 1/2002 | Tolmie et al. | |
| 2002/0010759 A1 | 1/2002 | Hitson et al. | |
| 2002/0032042 A1 | 3/2002 | Poplawsky et al. | |
| 2002/0065074 A1 | 5/2002 | Cohn et al. | |
| 2002/0068610 A1 | 6/2002 | Anvekar et al. | |
| 2002/0103008 A1 | 8/2002 | Rahn et al. | |
| 2002/0105861 A1 | 8/2002 | Leapman | |
| 2002/0115480 A1 | 8/2002 | Huang | |
| 2002/0132651 A1 | 9/2002 | Jinnouchi | |
| 2002/0151327 A1 | 10/2002 | Levitt | |
| 2002/0163780 A1 | 11/2002 | Christopher | |
| 2002/0173273 A1 | 11/2002 | Spurgat et al. | |
| 2002/0180803 A1 | 12/2002 | Kaplan et al. | |
| 2003/0028664 A1 | 2/2003 | Tan et al. | |
| 2003/0059022 A1 | 3/2003 | Nebiker et al. | |
| 2003/0073432 A1 | 4/2003 | Meade | |
| 2003/0079038 A1 | 4/2003 | Robbin et al. | |
| 2003/0097379 A1 | 5/2003 | Ireton | |
| 2003/0172209 A1 | 9/2003 | Liu et al. | |
| 2003/0198015 A1 | 10/2003 | Vogt | |
| 2003/0218445 A1 | 11/2003 | Behar | |
| 2004/0039860 A1 | 2/2004 | Mills et al. | |
| 2004/0090998 A1 | 5/2004 | Chen | |
| 2004/0151327 A1 | 8/2004 | Marlow | |
| 2004/0162029 A1 | 8/2004 | Grady | |
| 2005/0014536 A1 | 1/2005 | Grady | |
| 2006/0154530 A1 | 7/2006 | Novotney et al. | |
| 2006/0264114 A1 | 11/2006 | Novotney et al. | |
| 2007/0161262 A1 | 7/2007 | Lloyd | |
| 2007/0232098 A1 | 10/2007 | Danner et al. | |
| 2008/0123285 A1 | 5/2008 | Fadell et al. | |
| 2008/0125031 A1 | 5/2008 | Fadell et al. | |

FOREIGN PATENT DOCUMENTS

| | | |
|---|---|---|
| EP | 1 104 150 A2 | 5/2001 |
| EP | 1 168 770 A | 1/2002 |
| EP | 1 176 783 A2 | 1/2002 |
| GB | 2 362 237 A | 11/2001 |
| JP | 06-051881 A | 2/1994 |
| JP | H07-176351 A | 7/1995 |
| JP | 09-311993 A | 2/1997 |
| JP | H10-098512 | 4/1998 |
| JP | H10-321302 A | 12/1998 |
| JP | H10-334993 A | 12/1998 |
| JP | H11-288420 A | 10/1999 |
| JP | 2000-068006 A | 3/2000 |
| JP | 2000-214953 A | 8/2000 |
| JP | 2000-223215 A | 8/2000 |
| JP | 2000-223216 A | 8/2000 |
| JP | 2000-223218 A | 8/2000 |
| JP | 2001-035603 A | 2/2001 |
| JP | 2001-196133 A | 7/2001 |
| JP | 2001-230021 A | 8/2001 |
| JP | 2001-265360 A | 9/2001 |
| JP | 2001-306114 A | 11/2001 |

| | | | |
|---|---|---|---|
| JP | 2001-332350 A | 11/2001 |
| JP | 2002-025720 A | 1/2002 |
| JP | 2002-170643 A | 6/2002 |
| JP | 2002-203641 A | 7/2002 |
| JP | 2002-245719 A | 8/2002 |
| JP | 2002-252566 A | 9/2002 |
| JP | 2002-342659 A | 11/2002 |
| JP | 2002-374447 A | 12/2002 |
| JP | 3090747 U | 12/2002 |
| JP | 2003-015616 A | 1/2003 |
| JP | 2003-017165 A | 1/2003 |
| JP | 2003-031319 A | 1/2003 |
| JP | 2003-032351 A | 1/2003 |
| JP | 2003-092638 A | 3/2003 |
| JP | 2003-274386 A | 9/2003 |
| JP | 2004-531916 A | 10/2004 |
| KR | 2002-0015579 A | 2/2002 |
| WO | WO 00/60450 A1 | 10/2000 |
| WO | WO 01/13204 A1 | 2/2001 |
| WO | WO 01/17262 A1 | 3/2001 |
| WO | WO 01/62004 A2 | 8/2001 |
| WO | WO 02/43359 A2 | 5/2002 |
| WO | WO 02/49314 A2 | 6/2002 |
| WO | WO 02/075517 A2 | 9/2002 |
| WO | WO 02/087205 A1 | 10/2002 |
| WO | WO 02/103545 A2 | 12/2002 |
| WO | WO 04/084413 A2 | 9/2004 |

OTHER PUBLICATIONS

"Neuros MP3 Digital Audio Computer"; www.neurosaudio.com, downloaded Apr. 9, 2003, 6 pages.

Bindra, Ashok, "Standard Turns Monitor into I/O Hub," 1996, *Electronic Engineering Times*, vol. 918, p. 14.

Derman, Glenda; "Monitors Make Net Connections"; 1996, *Electronic Engineering Times*, vol. 933, pp. 60 and 69.

Lewis, Peter; "On Technology"; 2002, *Fortune Magazine*, pp. 240.

Sinitsyn, Alexander, "A Synchronization Framework for Personal Mobile Servers," Pervasive Computing and Communications Workshops (PERCOMW'04). Proceedings of the Second IEEE Annual Conference, Piscataway, NJ, USA, IEEE, Mar. 14, 2004, pp. 208-212.

Nokia, Quick Guide; Accessories Guide; 9357169; Issue 3 EN. (1999), 36 pages.

* cited by examiner 3.1 CONNECTOR PIN DESIGNATIONS:
3.1.1 OMNI: JAE DDI 30 pin connector series

| Pin | Signal name | I/O | Function |
|---|---|---|---|
| 1 | F/W GND | I | Firewire and charger ground |
| 2 | F/W GND | I | Firewire and charger ground |
| 3 | TPA+ | I/O | Firewire signal |
| 4 | USB D+ | I/O | USB signal |
| 5 | TPA- | I/O | Firewire signal |
| 6 | USB D- | I/O | USB signal |
| 7 | TPB+ | I/O | Firewire signal |
| 8 | USB PWR | I | USB power in. NOT for powering; only to detect USB host |
| 9 | TPB- | I/O | Firewire signal |
| 10 | Accessory Identify | I | Pull down in dock to notify iPod of specific device |
| 11 | F/W PWR+ | I | Firewire and charger input power (8V to 30V dc) |
| 12 | F/W PWR+ | I | Firewire and charger input power (8V to 30V dc) |
| 13 | ACCESSORY PWR(3V3) | O | 3.3V output from iPod. Current limited to 100mA. |
| 14 | Reserved | | |
| 15 | USB GND | GND | Digital ground in iPod |
| 16 | DGND | GND | Digital ground in iPod |
| 17 | Reserved | | |
| 18 | Dock Tx | I | Serial protocol (Data to iPod) |
| 19 | Dock Rx | O | Serial protocol (Data from iPod) |
| 20 | Accessory Detect | I/O | |
| 21 | Reserved | | |
| 22 | Reserved | | |
| 23 | Reserved | | |
| 24 | Reserved | | |
| 25 | LINE-IN L | I | Line level input to the iPod for the left channel |
| 26 | LINE-IN R | I | Line level input to the iPod for the right channel |
| 27 | LINE-OUT L | O | Line level output to the iPod for the left channel |
| 28 | LINE-OUT R | O | Line level output to the iPod for the right channel |
| 29 | Audio Return | GND | Audio return - Signal, never to be grounded inside accessory |
| 30 | DGND | GND | Digital ground iPod |
| 31 | Chassis | | Chassis ground for connector shell |
| 32 | Chassis | | Chassis ground for connector shell |

*FIG. 3A*

3.1.2 AUDIO/REMOTE: 8 pin Foxconn Apple Custom

| Pin | Signal name | I/O | Function |
|---|---|---|---|
| 1 | Audio Out Left / Mono Mic In | I/O | 30mW audio out left channel, also doubles as mono mic in |
| 2 | HP Detect | I | Internal Switch to detect plug insertion |
| 3 | Audio Return | GND | Audio return for left and right audio |
| 4 | Audio Out Right | O | 30mW audio out right channel |
| 5 | Reserved | | |
| 6 | Accessory 3.3V | O | 3.3V Accessory power 100mA max |
| 7 | Tx | O | Serial protocol (Data from iPod to Device) |
| 8 | Rx | I | Serial protocol (Data to iPod from Device) |
| 9 | D GND | GND | Digital ground for accessory |

FIG.3B

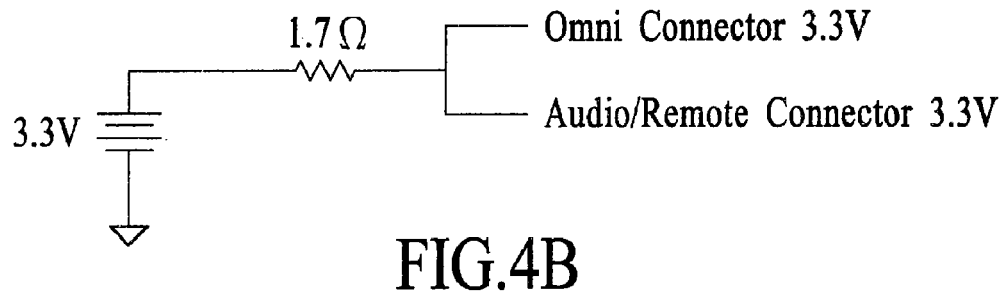

FIG.4B

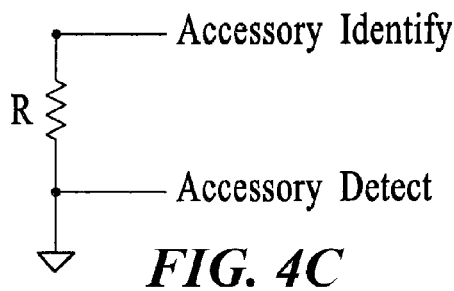

FIG. 4C

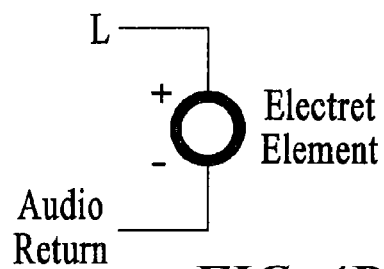

FIG. 4D

ELECTRONIC DEVICE HAVING A DUAL KEY CONNECTOR

CROSS-REFERENCES TO RELATED APPLICATIONS

The present application claims priority from and is a continuation of U.S. Non-Provisional application Ser. No. 12/210,022, Sep. 12, 2008; which is a continuation of U.S. Non-Provisional application Ser. No. 10/833,689, Apr. 27, 2004. The entire contents of each are incorporated herein by reference for all purposes.

The contents of the following related applications are herein incorporated by reference in their entirety for all purposes:

(1) U.S. application Ser. No. 12/209,962, now U.S. Pat. No. 7,660,929, issued Feb. 9, 2010, entitled "CONNECTOR INTERFACE SYSTEM FOR A MULTI-COMMUNICATION DEVICE" and filed concurrently with the present application;

(2) U.S. application Ser. No. 12/209,970, now U.S. Pat. No. 7,587,540, issued Sep. 8, 2009, entitled "TECHNIQUES FOR TRANSFERRING STATUS INFORMATION BETWEEN AN ACCESSORY AND A MULTI-COMMUNICATION DEVICE" and filed concurrently with the present application; and (3) U.S. application Ser. No. 12/209,993, now U.S. Pat. No. 7,702,833, issued Apr. 20, 2010, entitled "TECHNIQUES FOR TRANSFERRING INFORMATION BETWEEN AN ACCESSORY AND A MULTI-COMMUNICATION DEVICE" and filed concurrently with the present application.

FIELD OF THE INVENTION

The present invention relates generally to multi-communication devices and more particularly to a connector interface system for such devices.

BACKGROUND OF THE INVENTION

Multi-communication devices are utilized in a variety of environments. What is meant by a multi-communication device is a device such as MP3 player, or other type of device that receives video, audio, and a variety of other digital data and can provide an output of the data. As these devices proliferate, a connector interface specification becomes more important, and also insuring that a particular multi-communications device interfaces appropriately with the appropriate external devices becomes more important.

In a typical connector interface, there is a docking connector that allows for the docking of the multi-communications device to a docking station for another type of communication for the device. A multi-communication device also typically includes a remote connector with the ability to output audio. As more multi-media content becomes available (i.e., digital video graphics, etc.) it is desirable to have a multi-media device which can effectively input and output such data.

Finally, such an interface typically has some sort of protocol to control device features from an external device and it also is desirable for the protocol to help the user sort and search for data faster and in an efficient manner. Heretofore, there is no device that includes features that overcome many of the above-stated problems. What is desired is a connector interface system which is utilized in such a device to address all the above-identified issues. The present invention addresses such a need.

SUMMARY OF THE INVENTION

A connector interface system for a communication device is disclosed. The interface includes a docking connector. The docking connector includes first make/last break contacts that minimize internal damage to the internal electronics. The docking connector also includes specific keying arrangement to prevent noncompliant connectors from being plugged in, and thereby minimizes potential damage to the multi-communication device. The connector interface system also includes a remote connector which provides for the ability to output audio, input audio, and output video using an I/O serial protocol. Heretofore, all these features have not been implemented in a connector. Therefore, this would allow for a standard headphone cable to be plugged in but also for special remote control cables, microphone cables, video cables to be utilized in such a system. The connector interface system also includes a serial protocol to control device features. These controls help a user sort and search for data more efficiently within the device.

BRIEF DESCRIPTION OF THE DRAWINGS

FIG. 3A illustrates the connection pin designations for the docking connector.

FIG. 3B illustrates the connection pin designations for the remote connector.

FIG. 4B illustrates the USB connector interface.

FIG. 4C illustrates a reference schematic diagram for accessory detect and identify system for detecting and identifying accessories for the docking connector.

FIG. 4D is a reference schematic of an electret microphone that is within the remote connector.

DETAILED DESCRIPTION

The present invention relates generally to multi-communication devices and more particularly to a connector interface system for such devices. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Connector System Overview

To describe the features of the connector system in accordance with the present invention in more detail, refer now to the following description in conjunction with the accompanying drawings.

Docking Connector

Figure 1A:
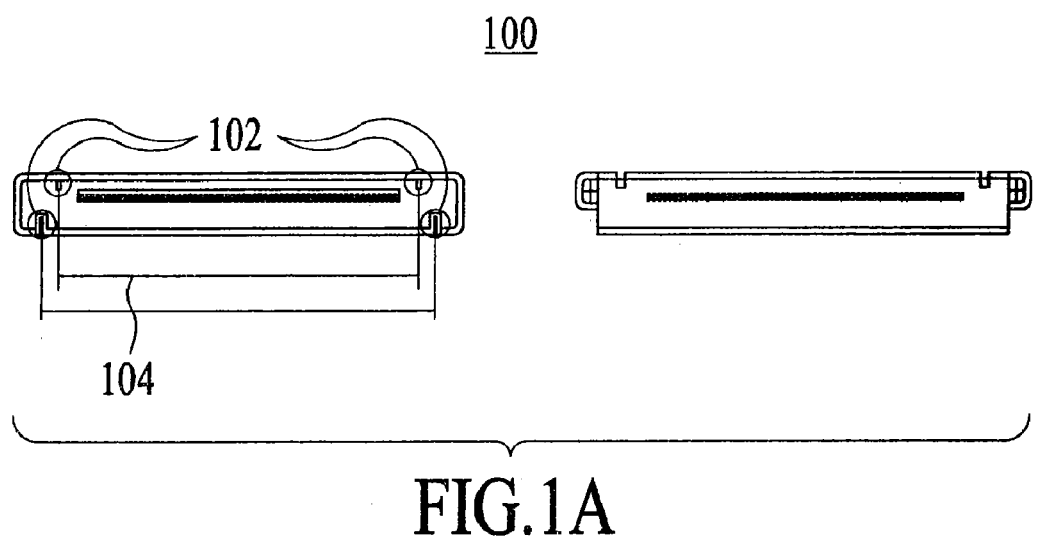
FIGS. 1A and 1B illustrate a docking connector in accordance with the present invention.
Figure 1B:
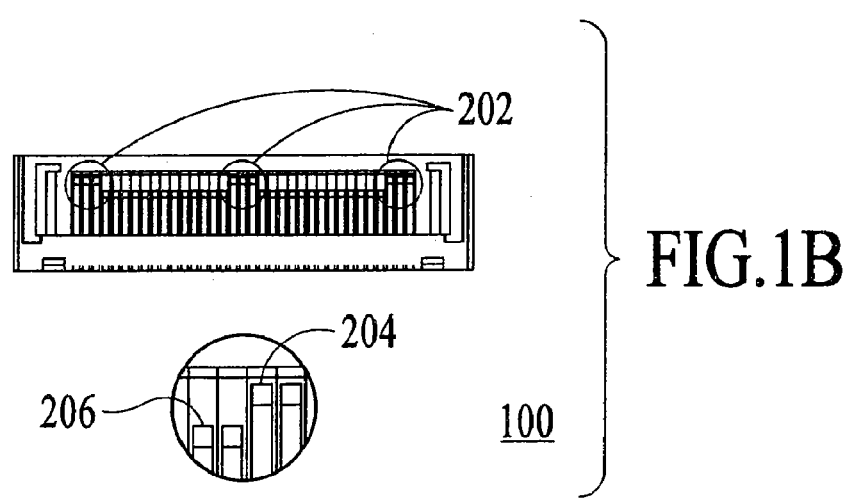

FIGS. 1A and 1B illustrate a docking connector 100 in accordance with the present invention. Referring first to FIG. 1A, the keying features 102 are of a custom length 104. In addition, a specific key arrangement where one set of keys are separated by one length are at the bottom and another set of keys are separated by another length at the top of the connector is used. The use of this key arrangement prevents noncompliant connectors from being plugged in and causing potential damage to the device. The connector for power utilizes a Firewire specification for power. The connector includes a first make/last break contact to implement this scheme. FIG. 1B illustrates the first make/last break contact 202 and also illustrates a ground pin and a power pin related to providing an appropriate first mate/last break contact. In this example, the ground pin 204 is longer than the power pin 206. Therefore, the ground pin 204 would contact its mating pin in the docking accessory before the power pin 206. Therefore internal electrical damage of the electronics of the device is minimized.

In addition, a connector interface system in accordance with the present invention uses both USB and Firewire interfaces as part of the same docking connector alignment, thereby making the design more compatible with different types of interfaces, as will be discussed in detail hereinafter. In so doing, more remote systems and devices can interface with the multi-communication device.

Remote Connector

Figure 2A:
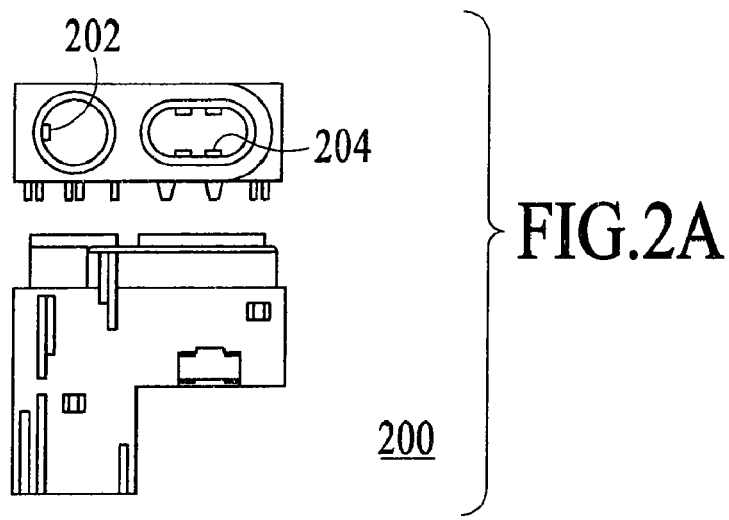
FIGS. 2A-2C illustrate the remote connector in accordance with the present invention.
Figure 2B:
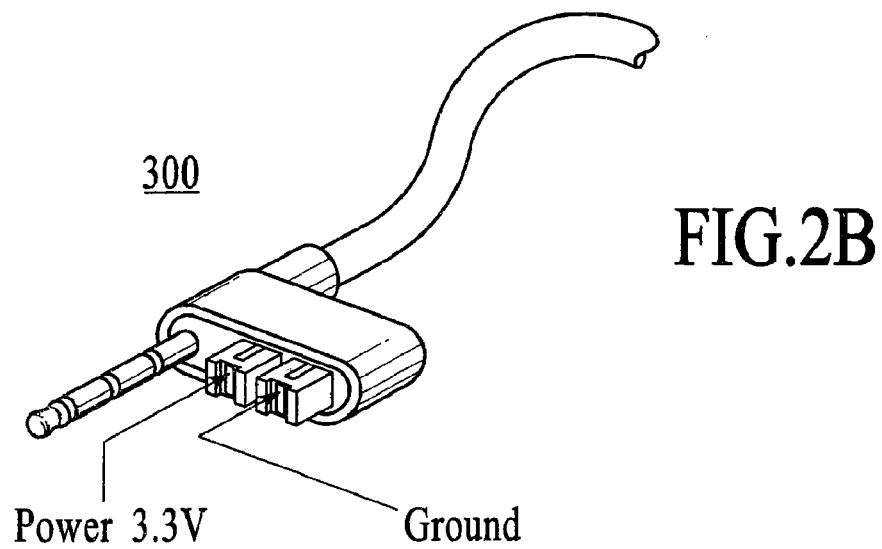
Figure 2C:
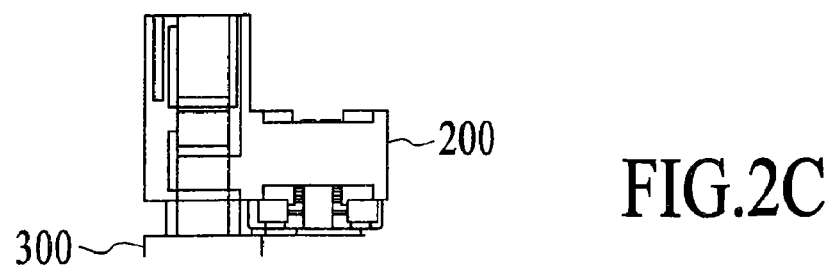

The connection interface system also includes a remote connector which provides for the ability to output audio, input audio, and output video using an I/O serial protocol. FIG. 2A is a front and top view of a remote connector 200 in accordance with the present invention. As is seen, the remote connector 200 includes a top headphone receptacle 202, as well as, a second receptacle 204 for remote devices. FIG. 2B illustrates a plug 300 to be utilized in the remote connector. The plug 300 allows the features to be provided via the remote connector. FIG. 2C illustrates the plug 300 inserted into the remote connector 200. Heretofore, all these features have not been implemented in a remote connector. Therefore, a standard headphone cable can be plugged in but also special remote control cables, microphone cables, video cables could be utilized with the remote connector.

Serial Protocol

The connector interface system also includes a serial protocol. The protocol is utilized to allow external devices to control the multi-communication device. These controls help a user sort and display for data more efficiently utilizing the device. A representation list of controls includes, but are not limited to:

Next album
Previous album
Next chapter
Previous chapter
Next play list
Previous play list
Shuffle setting advance
Repeat setting advance
Backlight for 30 seconds
Begin fast forward
Begin rewind To describe the features of the connector interface system in more detail, please find below a functional description of the docking connector, remote connector and a serial protocol in accordance with the present invention.

Docking and Remote Connector Specifications

For an example of the connector pin designations for both the docking connector and for the remote connector for a multi-communication device such as an iPod device by Apple Inc., refer now to FIGS. 3A and 3B. FIG. 3A illustrates the connector pin designations for the docking connector. FIG. 3B illustrates the connection pin designations for the remote connector.

Docking Connector Specifications

Figure 4A:
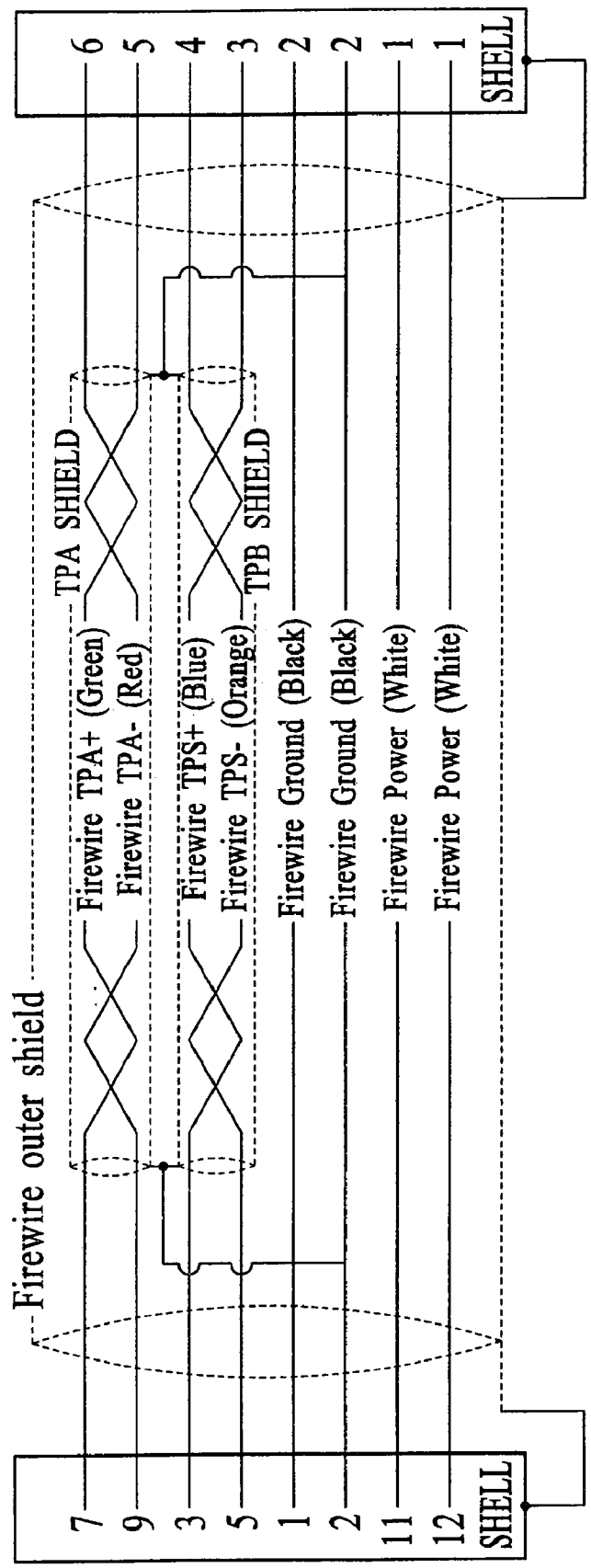
FIG. 4A illustrates the Firewire connector interface.

FIG. 4A illustrates a typical FireWire connector interface for the docking connector:

FireWire Power:
a) 8V-30V DC IN
b) 10 W Max
FireWire:
a) Designed to IEEE 1394 A Spec (400 Mb/s)
FIG. 4B illustrates the USB connector interface.
USB 2.0:
a) Designed to USB 2.0 High Speed Spec
b) The USB Power (pin 8 on the 30-pin connector) is not used for powering device; only used to detect a USB host connection.

FIG. 4C illustrates a reference schematic diagram for accessory detect and identify system for detecting and identifying accessories for the docking connector. The system comprises:

a) A simple resistor to ground allows the device to determine what has been plugged into docking connector. There is an internal pullup on Accessory Identify.
b) Two pins required (Accessory Identify & Accessory Detect)

Serial Protocol Communication:
a) Two pins are used to communicate to and from device (Rx & Tx)
b) Input & Output (0V=Low; 3.3V=High)
c) A device with an identity resistor (ID #13) is a serial dock accessory.

A device coupled to the docking connector allows for a standard serial protocol to be utilized. Attaching a serial dock accessory makes any top-attached (remote connector) accessories inactive.

Line Level Input (Left & Right):
a) Stereo audio input b) Input Level 1V RMS (max)
a) Chassis ground is tied to specified pins
b) Digital ground should not be tied to Audio Return Remote Connector Specifications Audio Out:
a) Stereo Output per channel volume controlled by device
Mono Mic In:
a) Mono mic in through Left channel
b) Filtered electret power supplied by internal device
FIG. 4D is a reference schematic of an electret microphone that is within the remote connector.

Serial Protocol Communication:
a) Two pins used to communicate to and from device (Rx & Tx)
b) Input & Output (0V=Low, 3.3V=High)

Serial Protocol

Protocol Generalities

As previously mentioned, another feature of the present invention is the use of a serial protocol for allowing features to be implemented for remote devices. In a preferred embodiment, the protocol builds upon a signaling protocol, such as the RS-232 serial specification. However, the signaling levels are nonstandard. In true RS-232, a mark is −7V and a space is 7V. In this protocol, a mark is 3.3V and a space is 1V. The signaling rate for this protocol is 19,200 bps. All signaling is at 8 bits data, no parity and one stop bit (8-N-1).

This protocol is to be used in both directions of a link. Every device is encouraged to implement both sending and receiving capabilities. It is be possible to determine the direction (host to device or device to host) of a packet from its contents only. This means that no packet is valid for sending from both the host and device.

All devices must be able to handle variable-length packets. For example, even though an identify packet currently has no defined data, a device must be able to understand an identify packet with data and should respond to the best of its ability. It must at least not lose sync to the packet signaling.

Lingo Specifications

| Lingo | ID |
|---|---|
| General | 0x00 |
| Microphone | 0x01 |
| Simple Remote | 0x02 |
| Display Remote | 0x03 |
| RF transmitter | 0x05 |

The general lingo is shared for housekeeping commands across all devices. The microphone lingo is used by the remote connector on the multi-communication device. The simple remote lingo is used by a standard in-line remote control. The display remote lingo is reserved for a device with similar functionality to the standard remote but with a display for status.

General Lingo Specification

| Command | ID | Data Length |
|---|---|---|
| Request identify | 0x00 | 0x00 |
| Identify | 0x01 | 0x01+ |

The host may send a request identify to the device to ask the device to reidentify itself.

The device sends an identify packet to identify itself. At this time multifunction (combo) devices are not supported. The identify data payload is thus the command ID 0x01 followed by a single byte of the same value as the lingo specification of the functionality the device implements unless specified otherwise. The identify packet returned in response to a request identify packet does not need to have the extra sync bytes and delays used during the startup process.

Simple Remote Lingo Specification

| Command | ID | Data Length |
|---|---|---|
| Buttons status | 0x00 | 0x00+ |

A simple remote device sends a buttons status command to indicate an updated status of which buttons are held down. The data of the packet is a number of bytes indicating which buttons are currently held down. The bytes are made up by ORing the masks of the buttons together. The device will send a 0x00 in data (or no data) to indicate all buttons are released. While any buttons are held down the device should repeat this packet on a predetermined interval. If no packet of this sort is received by the host for 200 ms the host may assume a packet was lost and go to "all buttons up" mode.

A representative simple remote button map is shown below:

Simple Remote Button Map

| Button | Number | Byte No, Mask |
|---|---|---|
| Play/Pause | 0 | 0, 0x01 |
| Volume Up | 1 | 0, 0x02 |
| Volume Down | 2 | 0, 0x04 |
| Next Track | 3 | 0, 0x08 |
| Previous Track | 4 | 0, 0x10 |
| Next Album | 5 | 0, 0x20 |
| Previous Album | 6 | 0, 0x40 |
| Stop | 7 | 0, 0x80 |
| Play/Resume | 8 | 1, 0x01 |
| Pause | 9 | 1, 0x02 |
| Mute toggle | 10 | 1, 0x04 |
| Next Chapter | 11 | 1, 0x08 |
| Previous Chapter | 12 | 1, 0x10 |
| Next Playlist | 13 | 1, 0x20 |
| Previous Playlist | 14 | 1, 0x40 |
| Shuffle setting advance | 15 | 1, 0x80 |
| Repeat setting advance | 16 | 2, 0x01 |
| Power On | 17 | 2, 0x02 |
| Power Off | 18 | 2, 0x04 |
| Backlight for 30 seconds | 19 | 2, 0x08 |
| Begin FF | 20 | 2, 0x10 |
| Begin REW | 22 | 2, 0x20 |

The use of the button remote map allows for features that heretofore have not been utilized in multi-communication devices such as an iPod device manufactured by Apple Inc.

A connector interface system for a communication device is disclosed. The interface includes a docking connector. The docking connector includes first make/last break contacts that minimize internal damage to the internal electronics. The docking connector also includes specific keying arrangement to prevent noncompliant connectors from being plugged in, and thereby minimizes potential damage to the multi-communication device. The remote connector provides for the ability to output audio, input audio, and output video using an I/O serial protocol. The connector interface also includes a serial protocol to control device features. These controls help a user sort and search for data more efficiently within the device.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An electronic device having an electronic connector, the electronic connector comprising:
    a keying arrangement having first and second sets of keys, the first set of keys being spaced apart by a first length and the second set of keys being spaced apart by a second length different than the first length; and
    a plurality of contacts including first, second and third ground contacts, first and second power contacts, an accessory power contact, a USB power contact, a plurality of USB signal contacts and left and right audio out contacts;
    wherein when the electronic connector mates with a corresponding second connector associated with an accessory device, at least one of the contacts is active and the first, second and third ground contacts make contact with ground contacts in the second connector before the accessory power contact makes contact with an accessory power contact in the second connector.

2. The electronic device set forth in claim 1 wherein the plurality of contacts consists of thirty contacts in sequentially numbered contact locations, and wherein the first, second and third ground contacts are at contact locations 2, 16 and 29, respectively.

3. The electronic device set forth in claim 1 wherein the electronic connector further comprises an accessory detect contact.

4. The electronic device set forth in claim 1 wherein the plurality of USB signal contacts include a USB D+ signal contact and a second USB D− signal contact.

5. The electronic device of claim 1 wherein the accessory power contact provides power out at a first power level and the first and second power input contacts receive a power in at a second power level that is higher than the first power level.

6. The electronic device set forth in claim 1 wherein the electronic connector further comprises first and second serial communication contacts for transmitting and receiving digital signals with an accessory device using a serial protocol.

7. The electronic device set forth in claim 1 wherein the plurality of contacts comprises thirty contacts in sequentially numbered contact locations, and wherein the first, second and third ground contacts are at contact locations 1, 16 and 30, respectively.

8. The electronic device set forth in claim 4 wherein another digital signal contact is positioned between the USB D+ and USB D− signal contacts.

9. The electronic device of claim 5 wherein the first power level is 3.3 volts.

10. The electronic device set forth in claim 6 wherein the electronic connector further comprises an accessory identify contact.

11. The electronic device set forth in claim 6 wherein the plurality of contacts comprise thirty contacts in sequentially numbered contact positions, and wherein the first ground contact is at contact location 2, the third ground contact is at contact location 29, and the second ground contact is between the first and third ground contacts.

12. The electronic device set forth in claim 7 wherein the first and second power contacts, accessory power contact and USB power contact are located at contact locations between the first and second ground contacts.

13. The electronic device set forth in claim 7 wherein the sequentially numbered contact locations further include fourth and fifth ground contacts designated for ground, the fourth ground contact being disposed at contact location 2 and the fifth ground contact location being disposed at contact location 15.

14. The electronic device set forth in claim 7 wherein the left and right audio out contacts are at contact locations between the second and third ground contacts.

15. The electronic device set forth in claim 7 wherein the left and right audio out contacts are at contact locations 27 and 28, respectively.

16. The electronic device set forth in claim 7 wherein the electronic connector further comprises an accessory detect contact.

17. The electronic device set forth in claim 8 wherein the another digital signal contact is a Firewire signal contact.

18. The electronic device set forth in claim 9 further comprising fourth, fifth and sixth ground contacts.

19. The electronic device set forth in claim 10 wherein the electronic connector further comprises a resistor coupled between the accessory identify contact and ground.

20. The electronic device set forth in claim 11 wherein the electronic connector further comprises left and right audio in contacts.

21. The electronic device set forth in claim 12 wherein the plurality of USB signal contacts are located at contact locations between the first and second ground contacts.

22. The electronic device set forth in claim 13 wherein the first and second power contacts, accessory power contact, USB power contact and the plurality of USB signal contacts are located at contact locations between the first and second ground contacts.

23. The electronic device set forth in claim 16 wherein the electronic connector further comprises an accessory identify contact.

24. The electronic device set forth in claim 8 wherein the plurality of contacts consists of thirty contacts in sequentially numbered contact locations, and wherein the first, second and third ground contacts are at contact locations 2, 16 and 29, respectively.

25. The electronic device set forth in claim 22 wherein the USB power contact is at contact location 8.

26. The electronic device set forth in claim 23 wherein the electronic connector further comprises a resistor coupled between the accessory identify contact and ground.

27. The electronic device set forth in claim 23 wherein the electronic connector further comprises first and second serial communication contacts for transmitting and receiving digital signals with an accessory device using a serial protocol, wherein the first and second serial communication contacts are located at contact locations between the second and third ground contacts.

28. The electronic device set forth in claim 24 further comprising fourth, fifth and sixth ground contacts.

29. The electronic device set forth in claim 27 wherein the first and second serial communication contacts are located at contact locations between the second ground contact and the left and right audio out contacts.

30. The electronic device set forth in claim 28 wherein when the electronic connector mates with a corresponding second connector associated with an accessory device, the fourth, fifth and sixth ground contacts make contact with ground contacts in the second connector before the accessory power contact makes contact with an accessory power contact in the second connector.

31. The electronic device of claim 28 wherein the accessory power contact provides power out at a first power level and the first and second power input contacts receive power in at a second power level that is higher than the first power level.

32. The electronic device of claim 31 wherein the first power level is 3.3 volts.

33. The electronic device set forth in claim 31 wherein the electronic connector further comprises a contact at location 20 that can be used to detect if an accessory is connected to the electronic connector.

34. An electronic device having an electronic connector, the electronic connector comprising:
 a keying arrangement having first and second sets of keys, the first set of keys arranged at a top of the connector and spaced apart by a first length and the second set of keys arranged at a bottom of the connector and spaced apart by a second length different than the first length; and
 a plurality of contacts including first, second and third ground contacts, first and second power contacts, an accessory power contact, a USB power contact, a plurality of USB signal contacts and left and right audio out contacts;
 wherein the accessory power contact provides power out at a first power level and the first and second power input contacts receive a power in at a second power level that is higher than the first power level; and wherein the ground contacts are longer than the accessory power contact so that when the electronic connector mates with a corresponding second connector associated with an accessory device, the ground contacts make contact with ground contacts in the second connector before the accessory power contact makes contact with an accessory power contact in the second connector.

35. The electronic device set forth in claim 34 wherein the plurality of contacts comprises thirty contacts in sequentially numbered contact positions, and wherein the first and third ground contacts are at contact locations 2 and 29 and the second ground contact is between the first and third ground contacts.

36. The electronic device set forth in claim 35 wherein the plurality of USB signal contacts includes a USB D+ signal contact and a second USB D− signal contact and wherein another digital signal contact is positioned between the USB D+ and USB D− signal contacts.

37. The electronic device of claim 36 wherein the first power level is 3.3 volts.

38. The electronic device of claim 37 wherein the plurality of contacts further includes fourth, fifth and sixth ground contacts.

* * * * *